United States Patent
Colon

(10) Patent No.: US 8,386,559 B2
(45) Date of Patent: Feb. 26, 2013

(54) METHOD FOR EXCHANGING REQUESTS BETWEEN THE COMPUTER APPLICATION OF A MOBILE TERMINAL AND AN INSTANTANEOUS MESSAGING SERVER

(75) Inventor: François Colon, Marseilles (FR)

(73) Assignee: Miyowa, Marseilles (FR)

( * ) Notice: Subject to any disclaimer, the term of this patent is extended or adjusted under 35 U.S.C. 154(b) by 516 days.

(21) Appl. No.: 12/024,142

(22) Filed: Feb. 1, 2008

(65) Prior Publication Data

US 2009/0068989 A1    Mar. 12, 2009

(30) Foreign Application Priority Data

Sep. 6, 2007   (FR) ...................................... 07/06244

(51) Int. Cl.
*H04L 12/56* (2006.01)
(52) U.S. Cl. ........................................ 709/203; 709/219
(58) Field of Classification Search ........................ None
See application file for complete search history.

(56) References Cited

U.S. PATENT DOCUMENTS

| | | | |
|---|---|---|---|
| 4,918,588 A | 4/1990 | Barrett et al. | |
| 5,561,851 A * | 10/1996 | Hubbell et al. | 455/512 |
| 5,870,605 A | 2/1999 | Bracho et al. | |
| 5,991,407 A | 11/1999 | Murto | |
| 6,377,691 B1 | 4/2002 | Swift et al. | |
| 6,434,600 B2 | 8/2002 | Waite et al. | |
| 6,504,480 B1 | 1/2003 | Magnuson et al. | |
| 6,816,970 B2 | 11/2004 | Morgan et al. | |
| 6,912,658 B1 | 6/2005 | Glogau et al. | |
| 7,032,030 B1 | 4/2006 | Codignotto | |
| 7,039,189 B1 | 5/2006 | Kienzle et al. | |
| 7,155,607 B2 | 12/2006 | Yokota et al. | |
| 7,350,076 B1 | 3/2008 | Young et al. | |
| 7,353,016 B2 | 4/2008 | Roundtree et al. | |

(Continued)

FOREIGN PATENT DOCUMENTS

| | | |
|---|---|---|
| EP | 0915590 A2 | 5/1999 |
| EP | 1587239 A1 | 10/2005 |

(Continued)

OTHER PUBLICATIONS

Rishi, Lata et al; "Presence and Its Effect on Network"; Personal Wireless Communications, ICPWC 2005, 2005 IEEE International Conference on New Delhi, India, Jan. 23-25, 2005, Piscataway, New Jersey; XP010798582, pp. 368-372.

(Continued)

*Primary Examiner* — Marcos Batista
*Assistant Examiner* — Frank Donado
(74) *Attorney, Agent, or Firm* — Harness, Dickey & Pierce, P.L.C.

(57) ABSTRACT

This invention relates to a method for exchanging requests between the computer application of a mobile terminal (A) and an instantaneous messaging server (1), wherein:
  the computer application sends requests (2) to server (1) relative to the detection of an event (3),
  requests (2) are sent according to a request frequency set to a first value,
whereby:
  when requests (2) are sent, if the event (3) is not detected by server (1), said server controls the computer application so that the latter sends the requests (2) according to a request frequency set to a second value that is lower than the first value,
  as soon as server (1) detects the event (3), said server controls the computer application so that the latter sends the requests (2) according to a request frequency set to the first value.

17 Claims, 2 Drawing Sheets

U.S. PATENT DOCUMENTS

| | | | |
|---|---|---|---|
| 7,389,324 B2 * | 6/2008 | Masonis et al. | 709/206 |
| 7,490,080 B2 * | 2/2009 | Longobardi et al. | 1/1 |
| 7,527,728 B2 | 5/2009 | Jackson | |
| 7,619,584 B2 | 11/2009 | Wolf | |
| 7,676,546 B2 * | 3/2010 | Hallam-Baker | 709/206 |
| 7,685,236 B1 | 3/2010 | Harik et al. | |
| 7,698,370 B1 | 4/2010 | Hall | |
| 7,711,794 B2 * | 5/2010 | Russell | 709/217 |
| 7,995,506 B2 | 8/2011 | Kalish | |
| 8,090,945 B2 | 1/2012 | Singhal | |
| 8,095,658 B2 | 1/2012 | Ashley et al. | |
| 8,099,770 B2 | 1/2012 | Makkinejad | |
| 8,117,287 B2 * | 2/2012 | Washburn | 709/219 |
| 8,196,186 B2 | 6/2012 | Mityagin et al. | |
| 2001/0013050 A1 | 8/2001 | Shah | |
| 2001/0014868 A1 * | 8/2001 | Herz et al. | 705/14 |
| 2002/0010746 A1 | 1/2002 | Jilk et al. | |
| 2003/0054810 A1 | 3/2003 | Chen et al. | |
| 2003/0073440 A1 | 4/2003 | Mukherjee et al. | |
| 2003/0105873 A1 | 6/2003 | Ye et al. | |
| 2003/0208557 A1 | 11/2003 | Higbee et al. | |
| 2003/0225843 A1 | 12/2003 | Sakata | |
| 2003/0232618 A1 | 12/2003 | Le et al. | |
| 2004/0052238 A1 | 3/2004 | Borella et al. | |
| 2004/0056901 A1 | 3/2004 | March et al. | |
| 2004/0086100 A1 | 5/2004 | Moore et al. | |
| 2004/0143632 A1 | 7/2004 | McCarty | |
| 2004/0143633 A1 | 7/2004 | McCarty | |
| 2004/0172455 A1 | 9/2004 | Green et al. | |
| 2004/0177119 A1 | 9/2004 | Mason et al. | |
| 2004/0266402 A1 | 12/2004 | Schavitz | |
| 2005/0021526 A1 | 1/2005 | Bazot et al. | |
| 2005/0030913 A1 | 2/2005 | Roy | |
| 2005/0044152 A1 | 2/2005 | Hardy et al. | |
| 2005/0055416 A1 * | 3/2005 | Heikes et al. | 709/207 |
| 2005/0055443 A1 | 3/2005 | Tosey et al. | |
| 2005/0080864 A1 | 4/2005 | Daniell | |
| 2005/0120077 A1 | 6/2005 | Albornoz et al. | |
| 2005/0144587 A1 | 6/2005 | Bryant | |
| 2005/0198173 A1 | 9/2005 | Evans | |
| 2005/0205660 A1 | 9/2005 | Munte | |
| 2005/0243854 A1 | 11/2005 | Ward | |
| 2005/0267980 A1 * | 12/2005 | Warren et al. | 709/232 |
| 2005/0273843 A1 | 12/2005 | Shigeeda | |
| 2005/0289180 A1 | 12/2005 | Pabla et al. | |
| 2006/0009243 A1 | 1/2006 | Dahan et al. | |
| 2006/0014530 A1 | 1/2006 | Denenberg et al. | |
| 2006/0085355 A1 | 4/2006 | Coley et al. | |
| 2006/0129643 A1 | 6/2006 | Nielson et al. | |
| 2006/0142880 A1 | 6/2006 | Deen et al. | |
| 2006/0168037 A1 | 7/2006 | Audu et al. | |
| 2006/0194596 A1 | 8/2006 | Deng | |
| 2006/0195506 A1 | 8/2006 | Deng | |
| 2006/0218234 A1 | 9/2006 | Deng et al. | |
| 2006/0240824 A1 | 10/2006 | Henderson et al. | |
| 2006/0259632 A1 | 11/2006 | Crawford et al. | |
| 2006/0265510 A1 | 11/2006 | Warren et al. | |
| 2006/0271859 A1 | 11/2006 | Gorzela | |
| 2007/0038974 A1 | 2/2007 | Albahari et al. | |
| 2007/0042754 A1 | 2/2007 | Bajikar et al. | |
| 2007/0124386 A1 * | 5/2007 | Klassen | 709/206 |
| 2007/0130277 A1 | 6/2007 | Roskind et al. | |
| 2007/0136814 A1 | 6/2007 | Lee et al. | |
| 2007/0140193 A1 * | 6/2007 | Dosa et al. | 370/338 |
| 2007/0174810 A1 | 7/2007 | Hockenberry et al. | |
| 2007/0192410 A1 | 8/2007 | Liversidge et al. | |
| 2007/0233859 A1 | 10/2007 | Zhao et al. | |
| 2007/0239866 A1 | 10/2007 | Cox et al. | |
| 2007/0250496 A1 | 10/2007 | Halliday et al. | |
| 2007/0253340 A1 | 11/2007 | Varney et al. | |
| 2007/0266076 A1 | 11/2007 | Cox et al. | |
| 2007/0282963 A1 * | 12/2007 | Mo et al. | 709/207 |
| 2008/0039032 A1 * | 2/2008 | Haumont | 455/115.1 |
| 2008/0040443 A1 | 2/2008 | Agrawal | |
| 2008/0120387 A1 | 5/2008 | Werndorfer et al. | |
| 2008/0126492 A1 * | 5/2008 | Guidi et al. | 709/206 |
| 2008/0133674 A1 | 6/2008 | Knauerhase et al. | |
| 2008/0134295 A1 | 6/2008 | Bailey et al. | |
| 2008/0177878 A1 | 7/2008 | Pierce | |
| 2008/0183846 A1 | 7/2008 | Colon | |
| 2008/0235798 A1 | 9/2008 | Lu | |
| 2008/0244014 A1 | 10/2008 | Britton et al. | |
| 2008/0267091 A1 | 10/2008 | Parkkinen et al. | |
| 2008/0288649 A1 | 11/2008 | Burckart et al. | |
| 2008/0299953 A1 | 12/2008 | Rao | |
| 2009/0031244 A1 | 1/2009 | Brezina et al. | |
| 2009/0068989 A1 | 3/2009 | Colon | |
| 2009/0083732 A1 | 3/2009 | Shen et al. | |
| 2009/0112988 A1 | 4/2009 | Colon | |
| 2009/0113007 A1 | 4/2009 | Colon | |
| 2009/0125591 A1 | 5/2009 | Kirkpatrick | |
| 2009/0176498 A1 | 7/2009 | Colon | |
| 2009/0187634 A1 | 7/2009 | Colon | |
| 2009/0210507 A1 | 8/2009 | Haverkos | |
| 2010/0055659 A1 * | 3/2010 | Rogers et al. | 434/362 |
| 2010/0057732 A1 | 3/2010 | O'Sullivan et al. | |
| 2010/0077018 A1 | 3/2010 | Acharya et al. | |
| 2010/0179982 A1 | 7/2010 | Colon | |
| 2010/0199340 A1 | 8/2010 | Jonas et al. | |
| 2010/0217809 A1 | 8/2010 | Vymenets et al. | |
| 2010/0228790 A1 | 9/2010 | Colon | |
| 2010/0293376 A1 | 11/2010 | Colon | |
| 2011/0001603 A1 | 1/2011 | Willis | |
| 2011/0016512 A1 | 1/2011 | Colon | |

FOREIGN PATENT DOCUMENTS

| | | | |
|---|---|---|---|
| EP | 1643744 A1 | 4/2006 | |
| EP | 2053806 A1 | 4/2009 | |
| FR | 2868177 A1 | 9/2005 | |
| WO | WO 2004/059447 | 7/2004 | |
| WO | WO-2006/084183 A1 | 8/2006 | |

OTHER PUBLICATIONS

French Search Report for FR 07/06244, dated Feb. 19, 2008.

Cheddad, Abbas et al.; "Digital Image Steganography: Survey and Analysis of Current Methods;" Signal Processing, Elsevier Science, vol. 90, No. 3, Publishers B.V. Amsterdam, NL, XP026748102, ISSN: 0165-1684, Sep. 6, 2009; pp. 727-752.

European Search Report EP07291423, dated Mar. 31, 2008.

French Search Report for Application No. FR 0850285, dated Sep. 15, 2008.

Kalika, Gabrielle; www.mobilemarketer.com; "Miyowa launches mobile social networking application;" Aug. 11, 2008; 2 pgs.

Ngo, Dong; http://news.cnet.com; "Miyowa's InTouch5: Cell phone contact evolved;" Aug. 5, 2008: 2 pgs.

Preliminary Search Report for French Application 0901849, dated Feb. 19, 2010.

Radek Kantor; "IV054—Chapter 13: Steganography and Watermarking;" Extract from the Internet, XP002569385, Oct. 17, 2003; 17 sheets of 34 slides.

www.miyowa.com; "Miyowa launches MoveMessenger;" Jul. 25, 2006; 2 pgs.

* cited by examiner

METHOD FOR EXCHANGING REQUESTS BETWEEN THE COMPUTER APPLICATION OF A MOBILE TERMINAL AND AN INSTANTANEOUS MESSAGING SERVER

PRIORITY

The present application claims priority to French Patent Application No.: FR 07/06244 filed on Sep. 6, 2007; the entire contents of which are incorporated herein by reference.

FIELD OF THE INVENTION

The present invention relates to a method for exchanging requests between the computer application of a mobile terminal and an instantaneous messaging server. It also relates to a system adapted to implementing this method. It also finally relates to a mobile terminal utilised for implementing the method of the invention.

BACKGROUND OF THE INVENTION

Instantaneous messaging on mobile terminals allows users to converse via written messages without having to indicate the address of the correspondent for each message sent as is the case for SMSs. In principle, each user defines a buddy list with whom he/she wishes to converse. Conversation can take place only if one or several buddies on the buddy list are connected to the instantaneous messaging service. All of the written messages appear at the same time on the screens of the mobile terminals of the users registered in the buddy list and who are connected to the instantaneous messaging service. As a result, several users can converse amongst themselves.

In particular, an instantaneous messaging server is configured to detect a user connected to the instantaneous messaging service and to inform the users in his buddy list of his presence so that they can converse.

The instantaneous messaging server is also configured to detect and receive messages sent from the mobile terminal of a user connected to the instantaneous messaging service and to transfer this message to the mobile terminals of the users in the buddy list who are also connected to the instantaneous messaging service. The messages are distributed to/from the instantaneous messaging server according to communication protocols that are well known to those skilled in the art and through the intermediary of a communications network, for example a wireless network.

More generally, the instantaneous messaging server is configured to detect and manage the events occurring in the instantaneous messaging system.

In an instantaneous messaging system, the mobile terminals comprise computer applications that send requests to the server relative to the detection of an event, with the server responding to these requests with certain information.

For example, when a user wishes to connect to the instantaneous messaging service, the computer application of his mobile terminal sends a request asking the server to establish a connection. This request can contain the identification of the user and a password that are needed for the server to authorise the connection.

Also, the computer application can send requests corresponding to a request for information in order to know if the server has detected any modifications in the status of the other mobile terminals that are likely to be connected to said server. In this case, the requests aim to ask the server if it has detected users connected to the instantaneous messaging service and/or if users that were initially connected have disconnected.

Requests that are sent can also correspond to information from the computer application to the server, of the activity of said application. For example, the application can send requests indicating to the server that a message is being written or that it is standing by for a message or that the user is momentarily absent, etc.

The computer application periodically sends the requests to the instantaneous messaging server according to a certain frequency.

International patent application No WO 2006/034933 discloses a method making it possible to provide a presence service, which comprises a buddy list (BL_R, BL-T) that can be displayed on a display device of a terminal. When activated, the buddy list (BL_R, BL-T) is itself displayed, and when deactivated, the buddy list (BL_R, BL-T) is not visible. In the event of a change in the status of at least one subscriber to be monitored and/or of at least one device (P_Source) associated with the subscriber, said buddy list (BL_R, BL-T) is updated by a control device (P_System). According to the present invention, the updating of the buddy list (BL_R, BL_T) when deactivated is carried out by the control system (P_System) using another process than that used when activated.

International patent application No WO 2005/019992A3 discloses a system that includes a user device communicating with a server device in the electronic network in such a way as to transmit message information to one or several buddy devices present in this electronic network. The server device according to WO 2005/019992A3 can include a profile database which is configured to store profiles, each one of these profiles comprising designated profile attributes intended for a corresponding profile of the messaging buddies. A user device can use a messaging application of the user device to enter a dynamic regrouping mode in order to generate a dynamic buddy list using a static buddy list based on a grouping request for the various profiles present in the profile database.

FIG. 1 is a diagram schematically depicting a method known in the art for periodically sending requests. Mobile terminal A of a first user is connected to instantaneous messaging server 1. The computer application of mobile terminal A periodically sends requests 2 to server 1 relative to the detection of an event. For example, requests 2 aim to ask server 1 if it has detected any new messages. However, any other type of request can be involved.

Requests 2 are sent according to a request frequency set to a first value, for example every 5 seconds. As long a server 1 does not detect a new message, said server does not respond to the requests and the latter continue to be sent at the same frequency.

When a second user in the buddy list of the first user writes a new message, the computer application of mobile terminal B of said second user sends a request 3 to server 1 in this sense. At this instant, server 1 detects this new event. And when the computer application of mobile terminal A sends a new request 2, server 1 is then able to send a response 4 and transmit the message written by the second user to the first user.

The computer application of mobile terminal A of the first user will continue to send requests 2 at the same frequency in order to be informed of the detection of a new message (i.e. a new event).

In the example in FIG. 1, it can be seen that the computer application of mobile terminal A sends a large number of requests 2 before obtaining the response 4 from server 1.

It is then understood that when the request frequency is very high, many resources are consumed by equipment on which the computer application is executed, and this, even if no event has been detected by the server. A high request frequency therefore generates a large number of unnecessary requests, which causes a problem, on the one hand because energy is needlessly consumed and that the battery of the mobile terminal will quickly lose its charge, and on the other hand because such requests overload the communications network between the server and the computer application. Such overloads can thus generate errors in the network.

On the contrary, if the request frequency is not high enough, the computer application will be informed too late of events that the server has detected. As a result, certain events that require a fast reaction on the part of the computer application are not processed in time.

Thus, there remains a need to improve methods for exchanging requests between the computer application of a mobile terminal and an instantaneous messaging server. In particular, there remains a need to optimise the emission frequency of the requests exchanged between the computer application of a mobile terminal and an instantaneous messaging server.

SUMMARY OF THE INVENTION

In a first aspect, there is provided a method for exchanging requests between the computer application of a mobile terminal (A) and an instantaneous messaging server (1), wherein:
- the computer application sends requests (2) to the server (1) relative to the detection of an event (3),
- the requests (2) are sent according to a request frequency set to a first value, whereby:
- when requests (2) are sent, if the event (3) is not detected by the server (1), said server controls the computer application so that the latter sends requests (2) according to a request frequency set to a second value that is lower than the first value,
- as soon as server (1) detects the event (3), said server controls the computer application so that the latter sends the requests (2) according to a request frequency set to the first value.

In certain embodiments, server (1) controls the computer application so that it continues to send the requests (2) according to a request frequency set to the first value, if a new event (3') is detected between a request sent according to a frequency set to the second value and the following request sent according to a frequency set to the first value.

In certain embodiments, server (1) sends no new command and lets the computer application send the requests (2) according to a request frequency set to the first value, if a new event (3') is detected between a request sent according to a frequency set according to the second value and the following request sent at a frequency set according to the first value.

In certain embodiments, server (1) controls the computer application so that it continues to send the requests (2) according to a request frequency set to the second value, if no new event is detected between a request sent according to a frequency set to the first value and the following request sent according to a frequency set to the first value.

In certain embodiments, server (1) sends no new command and lets the computer application send the requests (2) according to a request frequency set to the second value, if no new event is detected between a request sent according to a frequency set to the first value and the following request sent according to a frequency set to the first value.

In certain embodiments, server (1) controls the computer application so that it continues to send the requests (2) according to a request frequency set to the first value, if a new event is detected between two successive requests sent according to the first value.

In certain embodiments, server (1) sends no new command and lets the computer application send the requests (2) according to a request frequency set to the first value, if a new event is detected between two successive requests sent according to the first value.

In certain embodiments, server (1) controls the computer application so that it continues to send the requests (2) according to a request frequency set to the second value, if no event is detected between two successive requests sent according to the second value.

In certain embodiments, server (1) sends no new command and lets the computer application send the requests (2) according to a request frequency set to the second value, if no new event is detected between two successive requests sent according to the second value.

In certain embodiments, server (1) controls the computer application by transmitting a modification parameter of the request frequency to the latter, and the request frequency is set to the first or to the second value according to the modification parameter received by the computer application.

In another aspect, there is provided a system for implementing the method in accordance with one of the preceding claims, including a mobile terminal (A) equipped with a computer application and an instantaneous messaging server (1), and wherein:
the computer application comprises:
  means for controlling the periodic emission of requests according to a certain request frequency,
  means to receive a modification parameter of the request frequency sent by the server,
  means to modify the request frequency according to the modification parameter received,
server (1) comprises:
  means to detect an event,
  means to generate a modification parameter of the request frequency,
  means to transmit the modification parameter of the request frequency to the computer application of mobile terminal (A).

In another aspect, there is provided a system for implementing the method in accordance with one of the preceding claims, including a mobile terminal (A) equipped with a computer application and an instantaneous messaging server (1), and wherein:

In certain embodiments, the means to generate the modification parameter of the request frequency include a table of correspondence matching an event and a modification parameter of the request frequency.

In certain embodiments, the means to transmit the modification parameter of the request frequency to the computer application, include a first portion of code which, when executed, is able to transmit said modification parameter.

In another aspect, there is provided a mobile terminal able to connect to an instantaneous messaging service, wherein said mobile terminal integrates a computer application including:
  a first portion of code which, when executed, is able to code the periodic emission of requests according to a request frequency set to a certain value,
  a second portion of code which, when executed, is able to receive a modification parameter of the request frequency, wherein with the first portion of code, the request frequency depends on the modification parameter.

DETAILED DESCRIPTION OF CERTAIN PREFERRED EMBODIMENTS OF THE INVENTION

Figure 1:
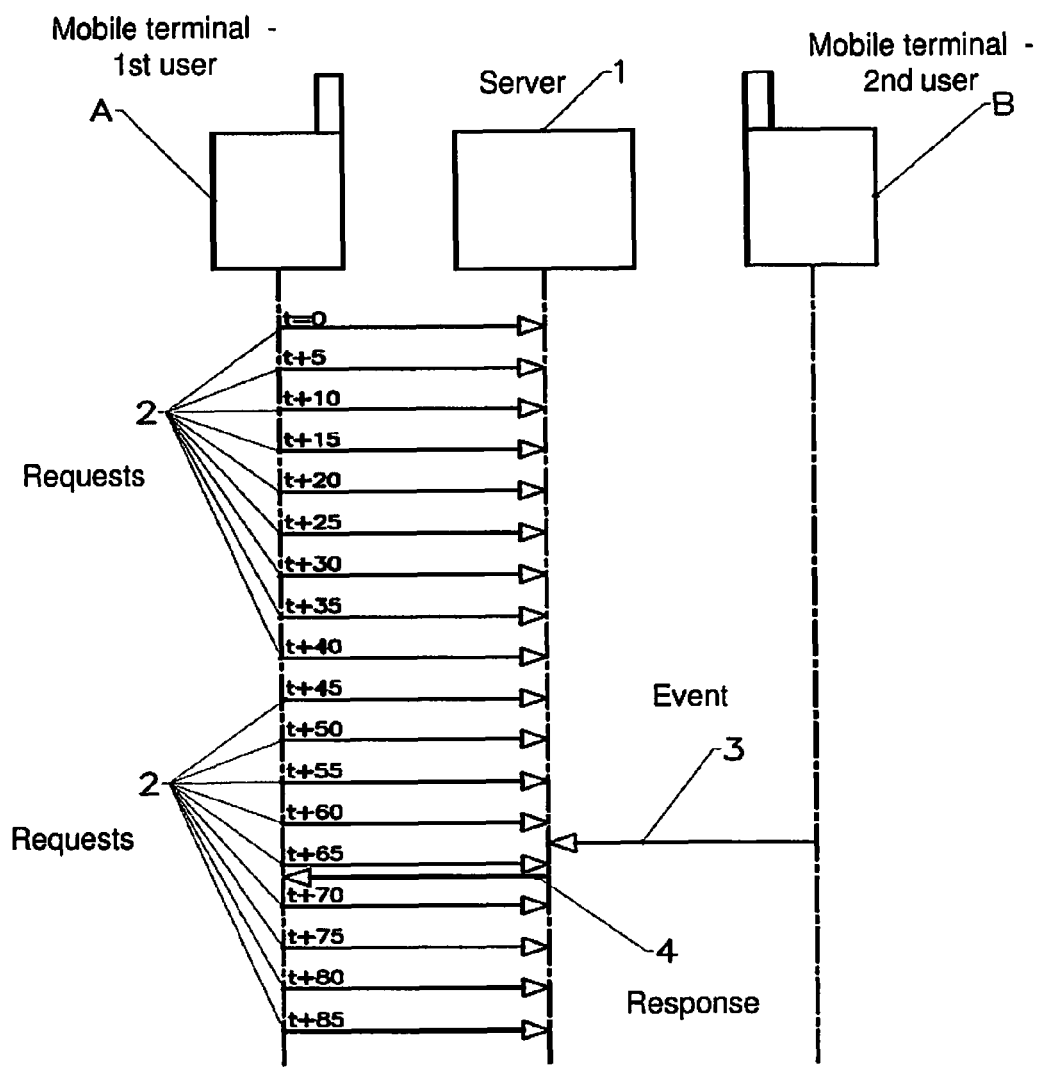
FIG. 1 is a diagram schematically depicting a known method for periodically sending requests.

The present invention allows to overcome the aforementioned disadvantages of the art. For example, in one aspect, the present invention allows to optimise the emission frequency of the requests exchanged between the computer application of a mobile terminal and an instantaneous messaging server.

In another aspect, the invention allows to improve the management of the energy consumed by the emission of the requests by the computer application from a mobile terminal to an instantaneous messaging server.

In yet another aspect, the invention allows to lighten the burden of the communications network between the computer application of a mobile terminal and an instantaneous messaging server.

Accordingly, there is provided a method for exchanging requests between the computer application of a mobile terminal and an instantaneous messaging server, wherein:
  the computer application sends requests to the server relative to the detection of an event,
  the requests are sent according to a request frequency set to a first value,
  the method being remarkable in that:
  when these requests are sent, if the event is not detected by the server, said server controls the computer application so that the latter sends the requests according to a request frequency set to a second value that is lower than the first value,
  as soon as the server detects the event, said server controls the computer application so that the latter sends the requests according to a request frequency set to the first value.

According to the invention, the request frequencies depend on a command sent by the server itself. The request frequency directly depends on the production of an event in the instantaneous messaging system. This therefore makes it possible to better control the emission frequency of requests according to the detection or non-detection of an event by the server. With the request frequency being optimised, the energy consumption due to the emission of requests is therefore also better managed and the communications network between the computer application and the server is cleared.

In certain embodiments, the present invention provides the following features:
  the server controls the computer application by transmitting to the letter a modification parameter of the request frequency,
  the request frequency is set to the first or to the second value according to the modification parameter received by the computer application.

In certain embodiments, the aforementioned features make it possible to modify the request frequency quickly and in a sure manner.

In another aspect, the invention provides a system designed to implement the method of the invention, as further described above and herein, and including the computer application of a mobile terminal and an instantaneous messaging server, wherein:
  the computer application comprises:
  means to control the periodic emission of requests according to a certain request frequency,
  means to receive a modification parameter of the request frequency sent by the server,
  means to modify the request frequency according to the modification parameter received,
  the instantaneous messaging server comprises:
  means to detect an event,
  means to generate a modification parameter of the request frequency,
  means to transmit the modification parameter of the request frequency to the computer application.

In certain embodiments, the means to generate the modification parameter of the request frequency include a table of correspondence that matches an event and a modification parameter of the request frequency. In certain embodiments, this feature makes it possible to simplify the modification of the request frequency.

In yet another aspect, the invention provides a mobile terminal able to connect to an instantaneous messaging service and integrating a computer application comprising:
  a first portion of code which, when executed, is able to code the periodic emission of requests according to a request frequency set to a certain value,
  a second portion of code which, when executed, is able to receive a modification parameter of the request frequency,
  wherein with the first portion of code, the request frequency depends on the modification parameter.

EQUIVALENTS

The representative examples that follow are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. It should further be appreciated that the contents of those cited references are incorporated herein by reference to help illustrate the state of the art.

EXEMPLIFICATION

Advantages and features of the invention can be understood further by the examples that follow, which help illustrate some of the exemplary embodiments of the present invention. It will be appreciated, however, that these examples do not limit the invention. Variations of the invention, now known or further developed, are considered to fall within the scope of the present invention as described herein and as hereinafter claimed.

As further discussed herein, the invention provides a method for exchanging requests between the computer application of a mobile terminal and an instantaneous messaging server.

The mobile terminals used to implement the method of the invention can be mobile telephones, devices of the personal digital assistant (PDA) type, or any other mobile communications terminal able to connect to an instantaneous messaging service. Mobile terminals are configured to be connected to a communications network of the MSM®, Jabber®, Yahoo!®, etc. type.

The mobile terminals integrate a computer application that sends to the instantaneous messaging server requests relative to the detection of an event. "Application" in the sense of this invention means one or several programmes, subroutines, firmware or any other type of equivalent software, taken singularly or in combination. By executing codes, programmes or any other equivalent means, the computer application is able to control the periodic emission of requests according to a desired frequency.

The server is of the type known by those skilled in the art in the field of instantaneous messaging. The server is connected to a communications network (MSM®, Jabber®, Yahoo!®, etc.) normally used to implement the instantaneous messaging services. In a well known manner, the server is equipped with a processor, controller or any other equivalent means making it possible to detect an event occurring in the instantaneous messaging system: connection or disconnection of a user, setting up of a filter for certain users in the buddy list, writing/transmitting/receiving a message, etc.

Figure 2:
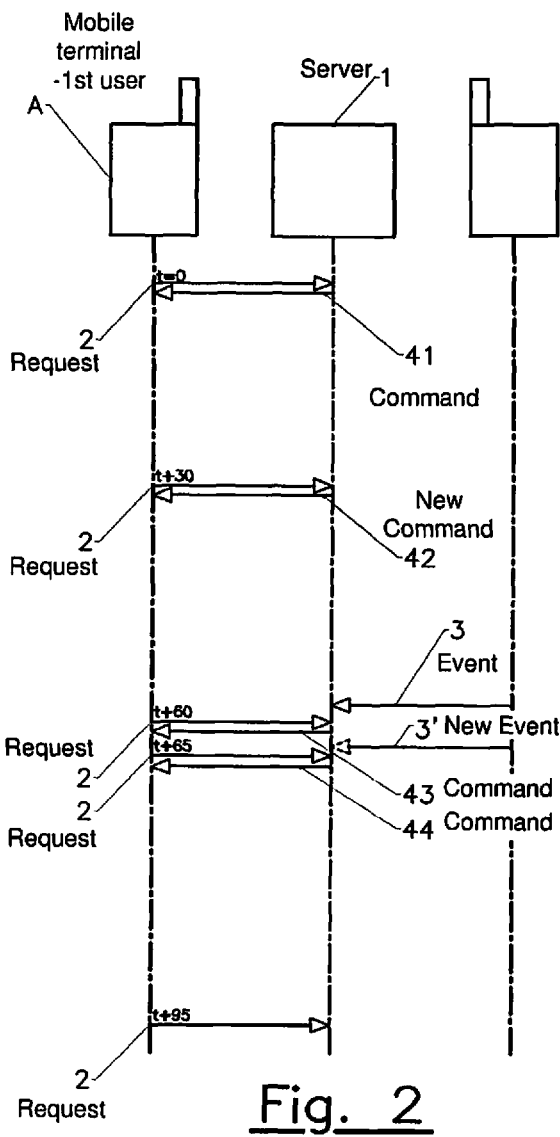
FIG. 2 is a diagram schematically showing a method for periodically sending requests according to one embodiment of the invention.

In certain embodiments, in reference to FIG. 2, mobile terminal A of a first user is connected to the instantaneous messaging server 1. The computer application of mobile terminal A sends requests 2 to server 1 relative to the detection of an event, for example the detection of new messages. However, the method that is the purpose of the invention applies to any other type of request.

During the execution of the computer application, requests 2 are sent according to a request frequency set to a first value, for example every 5 seconds. In practice, this first request frequency value is chosen in such a way as to best correspond to the habits of the users. It can for example be chosen according to the average time that a user takes to write a message. Generally, the first request frequency value depends on the type of event detected.

In certain embodiments, when requests 2 are sent, if the sought event is not detected by server 1, the latter controls the computer application so that it sends the requests according to a request frequency set to a second value that is lower than the first value, for example every 30 seconds. In practice, when the computer application sends a first request (t=0) and server 1 has not detected any event, said server is then able to send a command 41 to terminal A in such a way that the computer application sends the requests 2 according to a lower request frequency.

The same applies during the sending of the following requests (t+30). If server 1 has not yet detected an event, it sends a new command 42 in such a way that the computer application continues to send the requests 2 according to a request frequency set to the second value. However, in an alternative embodiment, server 1 can in this case send no new command and let the computer application send the requests according to the same frequency. The latter solution has the advantage of avoiding unnecessary congestion of the communications network.

At a given instant, server 1 will detect an event 3. For example, when a second user in the buddy list of the first user is writing a message, the computer application of mobile terminal B of said second user sends a request 3 to server 1 in this sense. At this instant, server 1 detects this new event. When the computer application of mobile terminal A sends a new request 2 (t+60), server 1 is then able to send a command 43 to mobile terminal A in such a way that the computer application sends the requests 2 according to a higher request frequency, set to the first value.

Subsequently, when the following requests 2 (t+65) are sent, if no new event is detected by server 1, the latter is then able to send a command 44 to terminal A in such a way that the computer application sends the requests 2 according to a lower request frequency set to the second value.

However, if a new event 3' is detected between a request sent according to a frequency set to the second value and the following request sent according to a frequency set to the first value, server 1 can control the computer application in such a way that it continues to send requests 2 according to a request frequency set to the first value. However, in an alternative embodiment, server 1 can send no new command and let the computer application send requests 2 according to a request frequency set to the first value.

Likewise, if a new event is detected between two successive requests sent according to a frequency set to the first value, server 1 can control the computer application in such a way that it continues to send requests 2 according to a request frequency set to the first value. In an alternative embodiment, the server sends no new command and lets the computer application send requests 2 according to a request frequency set to the first value.

Figure 3:
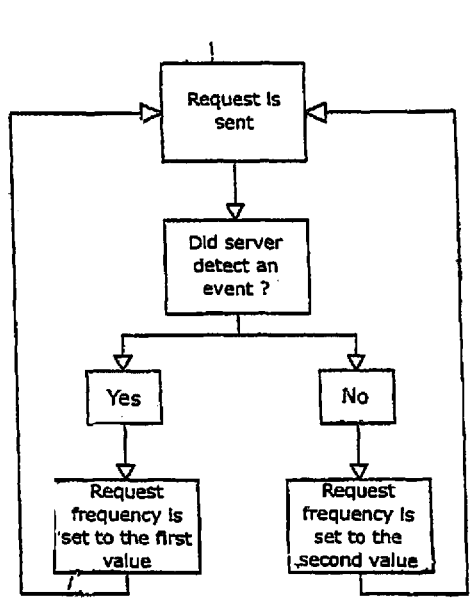
FIG. 3 shows different stages of the method of the invention.

The different stages and iterations of the method that is the purpose of the invention are summarised in FIG. 3.

In certain embodiments, Server 1 controls the computer application by transmitting it a parameter to modify the request frequency. This modification parameter is generated according to the detection or non-detection of an event in the instantaneous messaging system. The modification parameter generated by server 1 can for example by a code or piece of code, a programme or a piece of programme or any other equivalent means.

The modification parameter is generated by the intermediary of a programme or other software integrated into server 1. In certain exemplary embodiments of the invention, the modification parameter is generated by the intermediary of a table of correspondence matching a type of event and a modification parameter. In practice, the modification parameter corresponds to a number used to multiply or divide a frequency value that was initially programmed into the computer application (first or second value). As described above, the modification parameter may be determined in such a way that the request frequency value best correspond to the habits of the users.

The transmission of the modification parameter from server 1 and its reception by the computer application of mobile terminal A are carried out by means of transmission and reception known by those skilled in the art and normally used in instantaneous messaging services. In certain exemplary embodiments, the means to transmit the modification parameter to the computer application, include a first portion of code which, when executed, is able to transmit said modification parameter.

As soon as the computer application receives the modification parameter, said application analyses said parameter and executes a programme or other software configured to consequently modify the request frequency.

The computer application can comprise a first portion of code which, when executed, is able to code the periodic emission of requests according to a request frequency set to a certain value (first or second value) and a second portion of code which, when executed, is able to receive the modification parameter transmitted by server 1. And in the first portion of code, the request frequency depends on the modification parameter.

Those skilled in the art will recognize, or be able to ascertain using no more than routine experimentation, many equivalents to the specific embodiments of the invention described herein. The scope of the present invention is not intended to be limited to the above Description, but rather is as set forth in the following claims:

I claim:

1. A method for exchanging requests between a computer application of a first mobile terminal and an instant messaging (IM) server, the method comprising:
   detecting an event by the IM server, wherein the event that is detected includes a message being written by a computer application of a second mobile terminal, and wherein the second mobile terminal is included in a buddy list of the first mobile terminal;
   transmitting, from the IM server to the computer application of the first mobile terminal, a first value or a second value, wherein the IM server determines the first value based on a modification parameter that is generated by a table of correspondence matching types of events with modification parameters;
   by the computer application of the first mobile terminal, sending requests to the IM server;
   when the requests are sent by the computer application of the first mobile terminal, if the event is not detected by the IM server, controlling the computer application of the first mobile terminal using the IM server so that the computer application of the first mobile terminal sends the requests according to a request frequency set to the second value, wherein the second value is lower than the first value, and wherein the first value and the second value are defined by the IM server; and
   in response to the IM server detecting the event, controlling the computer application of the first mobile terminal using the IM server so that the computer application of the first mobile terminal sends the requests according to a request frequency set to the first value.

2. The method of claim 1, wherein the server controls the computer application of the first mobile terminal so that the computer application of the first mobile terminal continues to send the requests according to a request frequency set to the first value, if a new event is detected between a request sent according to a frequency set to the second value and the following request sent according to a frequency set to the first value.

3. The method of claim 1, wherein the server sends no new command and lets the computer application of the first mobile terminal send the requests according to a request frequency set to the first value, if a new event is detected between a request sent according to a frequency set according to the second value and the following request sent at a frequency set according to the first value.

4. The method of claim 1, wherein the server controls the computer application of the first mobile terminal so that the computer application of the first mobile terminal continues to send the requests according to a request frequency set to the second value, if no new event is detected between a request sent according to a frequency set to the first value and the following request sent according to a frequency set to the first value.

5. The method of claim 1, wherein the server sends no new command and lets the computer application of the first mobile terminal send the requests according to a request frequency set to the second value, if no new event is detected between a request sent according to a frequency set to the first value and the following request sent according to a frequency set to the first value.

6. The method of claim 1, wherein the server controls the computer application of the first mobile terminal so that the computer application of the first mobile terminal continues to send the requests according to a request frequency set to the first value, if a new event is detected between two successive requests sent according to the first value.

7. The method of claim 1, wherein the server sends no new command and lets the computer application of the first mobile terminal send the requests according to a request frequency set to the first value, if a new event is detected between two successive requests sent according to the first value.

8. The method of claim 1, wherein the server controls the computer application of the first mobile terminal so that the computer application of the first mobile terminal continues to send the requests according to a request frequency set to the second value, if no event is detected between two successive requests sent according to the second value.

9. The method of claim 1, wherein the server sends no new command and lets the computer application of the first mobile terminal send the requests according to a request frequency set to the second value, if no new event is detected between two successive requests sent according to the second value.

10. The method of claim 1, wherein:
    the server controls the computer application of the first mobile terminal by transmitting the modification parameter of the request frequency to the computer application of the first mobile terminal,
    the modification parameter is selected from the table of correspondence, and
    the request frequency is set to the first value or to the second value according to the modification parameter received by the computer application of the first mobile terminal.

11. A system for implementing the method of claim 1, including the first mobile terminal and the server, and wherein:
    the computer application of the first mobile terminal comprises:
       controlling periodic emission of requests according to a certain request frequency,
       receiving a modification parameter of the request frequency sent by the server, and
       modifying the request frequency according to the modification parameter received, and
    the server comprises:
       means for detecting an event,
       means for generating the modification parameter of the request frequency, and
       means for transmitting the modification parameter of the request frequency to the computer application of the first mobile terminal.

12. The system of claim 11, wherein the means for generating the modification parameter of the request frequency includes the table of correspondence.

13. The system of claim 11, wherein the means for transmitting the modification parameter of the request frequency to the computer application of the first mobile terminal includes a first portion of code which, when executed, is able to transmit the modification parameter.

14. A method of operating an instant messaging (IM) server, the method comprising:
    receiving, at the IM server, requests from a first mobile terminal at a specified frequency;
    monitoring for events, wherein the events include a message being written by a user of a second mobile terminal, and wherein the second mobile terminal is included in a buddy list of the first mobile terminal;

in response to detecting one of the events, (i) selecting a modification parameter from a correspondence table based on a type of the one of the events and (ii) sending a first command including the modification parameter to the first mobile terminal, the first command instructing the first mobile terminal to send the requests with the specified frequency set to a first value modified by the modification parameter; and in response to not detecting the events, sending a second command to the first mobile terminal, the second command instructing the first mobile terminal to send the requests with the specified frequency set to the first value.

15. The method of claim 14, wherein the second command instructs the first mobile terminal to send the requests with the specified frequency set to one of (i) the first value multiplied by the modification parameter and (ii) the first value divided by the modification parameter.

16. The method of claim 14, further comprising, in response to detecting one of the events, waiting to send the second command until a subsequent one of the requests is received at the IM server.

17. The method of claim 14, further comprising setting the first value according to an average time that a user takes to write a message.

\* \* \* \* \*